(12) United States Patent
Wood et al.

(10) Patent No.: US 7,161,465 B2
(45) Date of Patent: Jan. 9, 2007

(54) ENHANCING SECURITY FOR FACILITIES AND AUTHORIZING PROVIDERS

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 0 days.

(21) Appl. No.: 11/320,138

(22) Filed: Dec. 28, 2005

(65) Prior Publication Data

US 2006/0102717 A1    May 18, 2006

Related U.S. Application Data

(63) Continuation-in-part of application No. 10/443,382, filed on May 22, 2003, now Pat. No. 7,047,204.
(60) Provisional application No. 60/461,226, filed on Apr. 8, 2003.

(51) Int. Cl.
*G06Q 40/00* (2006.01)
*G06N 5/02* (2006.01)
*G06K 19/00* (2006.01)
*H04K 1/00* (2006.01)

(52) U.S. Cl. ............... 340/5.2; 705/38; 706/47; 713/186
(58) Field of Classification Search ............ 340/5.7, 340/5.2; 705/38
See application file for complete search history.

(56) References Cited

U.S. PATENT DOCUMENTS

| 6,311,272 | B1 * | 10/2001 | Gressel | 713/186 |
| 6,990,588 | B1 * | 1/2006 | Yasukura | 713/186 |
| 7,028,018 | B1 * | 4/2006 | Kocher | 706/47 |
| 2004/0024694 | A1 * | 2/2004 | Lawrence et al. | 705/38 |

* cited by examiner

*Primary Examiner*—Wendy R. Garber
*Assistant Examiner*—Clara Yang
(74) *Attorney, Agent, or Firm*—Buskop Law Group PC; Wendy Buskop

(57) ABSTRACT

Methods for controlling access to a facility and access to funds from authorizing providers are disclosed. The methods assign an environmental risk profile to the facility and risk factors to the authorizing provider, wherein both include point of entry systems. A person is pre-registered for access to the facility or funds or registered using an authentication server from public or private entities or authorizing providers. The person is issued an individual identification code on a smart card that is read and compared to the person's biometric data at the point of entry system, which contacts the authentication server to verify the person's eligibility. Personal data on the person is compiled using sets of rules to create an individual risk profile or an access level for receiving funds. Second and third transmissions communicate information for updating the individual risk profile for accessing the facility or updating the access level to funds.

28 Claims, 3 Drawing Sheets

ENHANCING SECURITY FOR FACILITIES AND AUTHORIZING PROVIDERS

CROSS REFERENCE TO RELATED APPLICATIONS

This application is a continuation-in-part of U.S. patent application Ser. No. 10/443,382 filed on May 22, 2003, now U.S. Pat. 7,047,204, and U.S. patent application Ser. No. 10/428,213 filed on May 2, 2003, now U.S. Pat. No. 6,820,059, which claim priority to provisional U.S. Patent Application Ser. No. 60/461,226 filed on Apr. 8, 2003, entitled "Method for Reducing Fraud in Government Benefit Programs Using a Smart Card", all of which are incorporated herein by reference.

FIELD

The present embodiments generally relate to methods for controlling access to a facility and controlling access to funds from an authorizing provider.

BACKGROUND

Government agencies attempt to improve security to airports, the Pentagon, and other institutions using databases, which can identify and verify that certain individuals are who they claim to be, for such important purposes as reducing terrorism. Similar mechanisms regarding identity and verification of identity are used by the banking industry for funding and credit approvals.

A need exists for a risk assessment method and system that provides alarms and/or notification when certain levels of a risk are detected for an individual attempting to enter or exit an environment that has some level of security assigned to it.

A need exists for a risk assessment system and method that provides prior notification when certain levels of a risk are detected for an individual attempting to access funds from an environment that has assigned levels of security regarding the approval for funding.

A need exists for a method to reduce the magnitude of costs involved in reviewing and determining requests for access to a public governmental facility, a private facility, and to an authorizing provider for access to funds. Such a method can reduce the rate of increase of governmental and private costs for providing security as well as to enable more people to be tracked more quickly and easily.

The present embodiments of the invention meet these needs.

SUMMARY

The present embodiments generally relate to methods for controlling access by an individual to a public or private facility and controlling access by an individual to levels of funds from an authorizing provider.

The methods for controlling access to a facility include the steps of assigning an environmental risk profile to the facility having a point of entry system, and registering a person for access to the facility and the secured areas of the facility. Alternatively, the person can be pre-registered, having completed the registration process at a previous point in time.

The registration of the person can include using an authentication server and issuing an individual identification code (IIC) to the person on a smart card comprising biometric data stored on a chip and having access to a biometric reader. The individual identification code (IIC) can include: a first biometric data, a first personal identification number code (PIN), a first electronic signature, personal data, and combinations thereof.

Further, the embodiments of the methods can include the steps of obtaining personal data at a first point in time on the person, to complete the registration of the person, and comparing the personal data to a first set of rules to form an individual risk profile for the person.

The steps of the methods can include reading the biometric data of the person stored on the smart card in order to confirm the identity of the person at the point of entry as the smart card holder. For example, a biometric data of the person, such as a person's fingerprint, can be scanned or obtained using a point of entry system and, then, compared to the smart card biometric data or personal data, such as a fingerprint stored on the biometric chip of the smart card or other biometric or personal data stored on the memory chip of the person's smart card, which is read using the point of entry system. Then, the comparison of the scanned biometric data to the smart card data can be performed for determining if the scanned biometric data of the person is the same as the smart card data of the person or if both data represent the same person for confirming and verifying the identity of the person at the point of entry as the smart card holder. If the scanned or obtained biometric data of the person at the point of entry and the smart card data do not represent the same person, then the person is denied access to the facility.

If the scanned or obtained biometric data of the person at the point of entry and the smart card data represent the same person, then the steps of the method can continue with the reading of the smart card data by the point of entry system for contacting the authentication server in a first transmission to obtain the person's individual risk profile and verify eligibility for access to the facility. Alternatively, the person with the smart card can be detained at the point of entry to allow for additional information data transmissions. Then, the received additional information data can be used in further comparisons to verify the identity of the person at the point of entry as the smart card holder, who is also the owner of the smart card. As a result of the comparisons of the information data, the identity of the person at the point of entry is either verified, or not verified, as the correct smart card holder for accessing the facility.

The next steps in the method can include making optional, additional transmissions to additional or secondary information servers according to a set of transmission rules to retrieve additional information on the person and using a second set of rules to update the individual risk profile of the person on the authentication server. Then, this updated individual risk profile can be transmitted from the authentication server in a second transmission to the point of entry system to provide an updated individual risk profile and to verify eligibility.

The next steps of the method include comparing the updated risk profile to the environmental risk profiles of the facility using the point of entry system and applying a third set of rules to determine if the person with the updated individual risk profile can enter the facility with the assessed environmental risk profile. Next, the method includes mak ing a third transmission from the point of entry system to the authentication server to provide a further updated individual risk profile on the person as the smart card holder for accessing the facility. Access qualifications and levels of risk factors for an environmental risk profile of a facility can be determined by the owner of the facility. If access is approved for a person, then the person can be escorted to and from the secured area.

The method for controlling access to funds by an individual from an authorizing provider includes assigning a risk factor to an authorizing provider having a point of entry system, and registering the individual using an authentication server for the authorizing provider. Alternatively, the person can be pre-registered by having completed the registration process at a previous point in time.

The registration of the person includes using an authentication server and issuing an individual identification code (IIC) to the person on a smart card comprising biometric data stored on the smart card and having access to a biometric reader. The individual identification code (IIC) can include: a first biometric data, a first personal identification number code (PIN), a first electronic signature, personal data, and combinations thereof. The person's personal data can be recorded on a memory chip embedded in the smart card to be used in identity authentication and confirmation of the person as the smart card holder. Identity authentication of the person for access to funds can be accomplished also by scanning a cardless biometric data of the person at the point of entry, transmitting a contactless personal data of the person to the point of entry system, scanning and transmitting a contactless biometric data of the person to the point of entry system, and combinations thereof.

Next, the methods include the steps of obtaining personal data at a first point in time on the person and, then, comparing the personal data to a first set of rules to create an access level to funds for the person. Then, the biometric data of the person at the point of entry can be read by a biometric reader to confirm identity of the person as the smart card holder and for accessing funds from an authorizing provider. Alternatively, the person can be detained at the point of entry to allow for additional information transmissions and data comparisons to confirm the identity of the person at the point of entry as the smart card holder.

The next steps of the methods include the point of entry system, in communication with the smart card, making the first transmission to the authenticating server for verification of eligibility of the person for accessing a level of funds for the person.

The steps of the methods can include optional, additional transmissions to servers with databases for retrieving and providing additional information, and using the authentication server with a second set of rules to update the access level to funds for the person. The method steps continue by the authentication server sending a second transmission to the point of entry system for the authorizing provider to provide the updated information regarding the person's eligibility for accessing a level of funds.

Next, the person's access level to funds is compared to a set of risk factors of the authorizing provider by applying a third set of rules for determining an updated access level to funds for the person. Then, the point of entry system can send a third transmission to the authentication server to provide the further updated access level to funds for the person.

BRIEF DESCRIPTION OF THE DRAWINGS

The detailed description will be better understood in conjunction with the accompanying drawings as follows.

Figure 1:
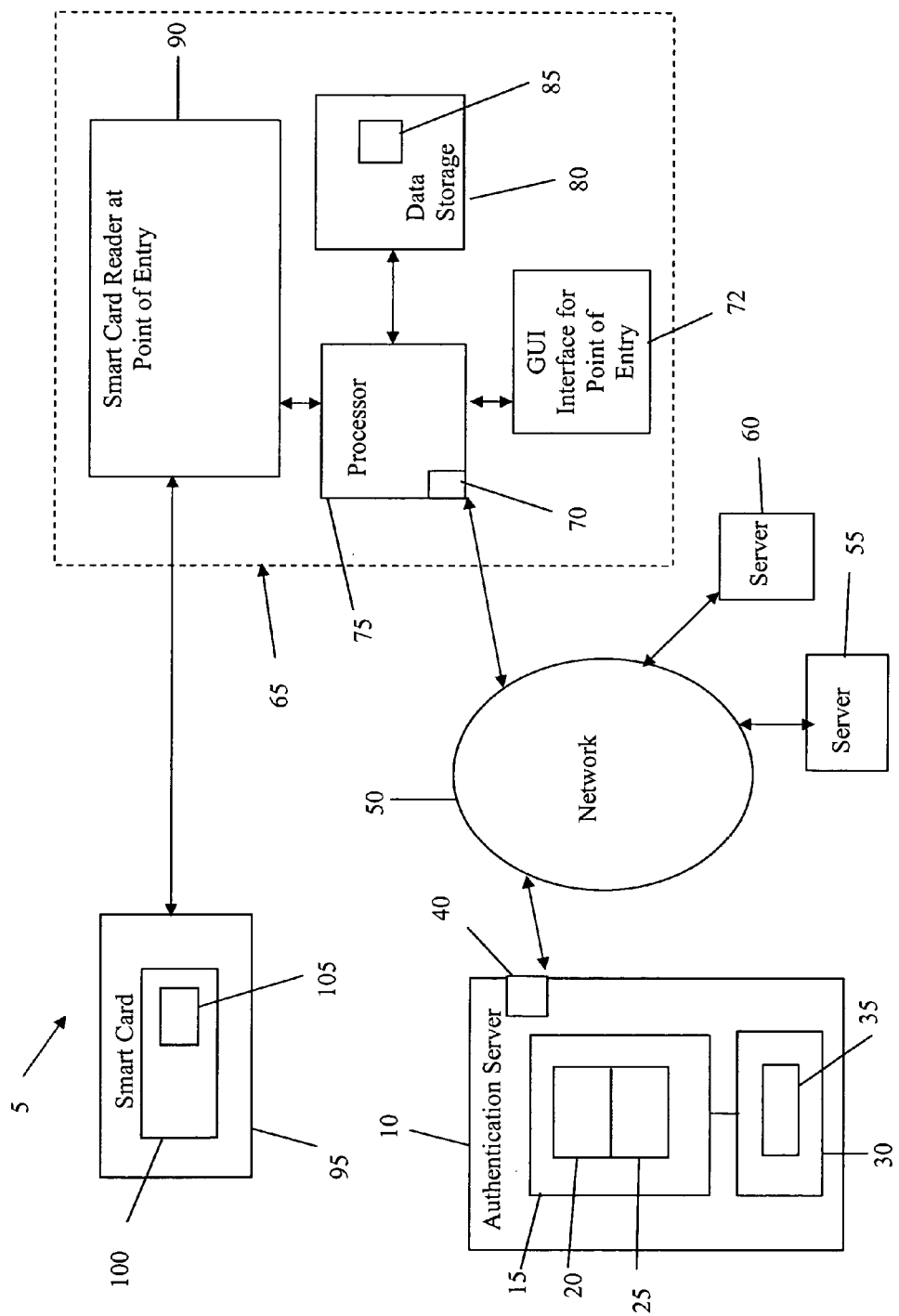
FIG. 1 depicts a diagram of an embodiment of a method for controlling access to a facility by an individual using a smart card.

The present embodiments are detailed below with reference to the listed Figures.

DETAILED DESCRIPTION OF THE EMBODIMENTS

Before explaining the presently disclosed embodiments in detail, it is to be understood that the embodiments are not limited to the particular embodiments and that the embodiments can be practiced or carried out in various ways.

The present embodiments generally relate to methods for controlling access to a facility and controlling access to a level of funds from an authorizing provider.

The embodiments of the method include controlling access to a facility by assigning an environmental risk profile or a risk value to the facility, which includes a point of entry system. Next, a person desiring access to the facility is registered to an authentication database of an authentication server for a governmental entity, a private entity, other public entity, and combinations thereof. For example, a person desiring access to a governmental building, such as the Pentagon, can be registered by a governmental authentication server that is used to provide and to store information on individuals regarding access to and from the Pentagon, as well as secured areas located within and around the Pentagon. However, if the facility in which the person desires access is a private facility, such as a privately-owned company building, then the authentication server can be an authentication server that is owned and operated by the private entity or an authentication server that provides information for the private entity.

The registration of the person can include issuing an individual identification code (IIC) to the person on a smart card, which can include: a personal data, a biometric data, and combinations thereof, stored on the smart card and having access to a biometric reader. The identification code for the person can include: a biometric data, a personal identification number (PIN), an electronic signature, other personal data, and combinations thereof. A smart card, such as those desired in McGregor, U.S. Pat. No. 6,954,133 hereby incorporated herein by reference, can apply to or can be employed in this invention. In an embodiment, personal data and/or biometric data can be placed on a memory chip embedded within the smart card. Alternatively, personal data and/or biometric data can be stored on the smart card using a magnetic stripe and barcodes for identity authentication purposes regarding the smart card holder.

The embodiments of the method include obtaining personal data on the person by, for example, asking the person to answer a plurality of questions for completing the registration process, such as a defined set of questions that require the person to answer "yes" or "no", and comparing the answers to a first set of rules to form an individual risk profile for the person.

In an embodiment, identity authentication of the person desiring access to the secured facility can be accomplished by detecting and/or scanning a cardless biometric data of the person at the point of entry system for the facility, such as the person's electro-biometric signature; transmitting a contactless personal data of the person to the point of entry system for the facility; scanning and transmitting a contactless biometric data of the person to the point of entry system for the facility; and combinations thereof.

The embodiments of the method can include access to the facility at the point of entry by using: a fingerprint reader, a numerical code and numerical code reader or detector, a voice pattern recognition reader, a retinal scanner, a telemetry card reader, a barcode reader, a Deoxyribonucleic Acid (DNA) reader, a palm reader, a facial recognition reader, a vein reader, other biometric readers, and combinations thereof.

The smart card can become activated when a biometric reader reads the biometric data of the smart card holder that is stored on the smart card. The method includes reading the biometric data of the smart card holder at the point of entry in order to confirm the identity of the person at the point of entry as the smart card holder. For example, a biometric data of the person, such as the person's fingerprint, can be scanned or provided using the point of entry system. Then, the biometric data of the person can be compared to the smart card biometric data or personal data, such as the person's fingerprint and name that is stored on the memory chip of the smart card, which is read by the point of entry system. Next, a comparison of the scanned or provided biometric data to the smart card data can be performed for determining if the scanned or provided biometric data of the person is the same as the smart card data of the smart card holder, or if both data represent the same person, for confirming and verifying the identity of the person at the point of entry as the smart card holder.

If the scanned or provided biometric data of the person and the smart card data do not represent the same person, then the person at the point of entry is denied access to the facility. If the scanned or provided biometric data of the person and the smart card data of the smart card holder represent the same person, then the smart card data can be read by the point of entry system for a first transmission to the authentication server for obtaining the person's individual risk profile to verify eligibility for access to the facility. Alternatively, the person with the smart card can be detained at the point of entry to allow for additional information data transmissions. Then, the received additional information can be used in further data comparisons to verify the identity of the person at the point of entry as the smart card holder and owner of the smart card. As a result of the additional data comparisons, the identity of the person at the point of entry can be either verified or not verified as the correct smart card holder and permitted or denied access to the facility, respectively.

The smart card can be read by the point of entry system, which includes a processor, a data storage, and the ability to communicate over a network. The point of entry system contacts the authentication server to verify the person's eligibility for access by obtaining the person's individual risk profile information. The network can be: a cable network, a wireless network, a fiber optic network, a satellite network, and combinations thereof. The network can include: an Internet network, a wide area network (WAN), a local area network (LAN), an Intranet, and combinations thereof.

Optional, additional transmissions to and from additional information servers and databases can be made in accordance with sets of transmission rules for gathering additional information on the person.

Then, the authentication server system and a second set of rules can be used to update an individual risk profile by using the retrieved information data. The authentication server can receive the additional information and can compile an updated individual risk profile for the person desiring access to the facility. Then, the authentication server can transmit the updated individual risk profile, for verifying the person's eligibility, to the point of entry system in a second transmission.

Next, the updated individual risk profile can be compared to environmental risk profiles for the facility using the point of entry system and a third set of rules to determine if the person with the updated individual risk profile can enter the facility, as a verified person with the assessed environmental risk profile. The method continues with a third transmission to the authentication server from the point of entry system to provide the further updated individual risk profile for entry and access to the facility and for completion of the process.

The processor of the point of entry system can be connected to a data storage for storing and retrieving information, including machine-readable signals in the data storage, and for sending the information or data to an input device, which receives the input data. The input data can be converted into input electrical data and transmitted to a visual display unit. The visual display unit can convert the output electrical data into output data having a visual presentation and can send the output data to a printer for converting the output data into printed documentation. The processor can be programmed to control the device to receive the input data and to produce the output data.

The embodiments provide risk assessment methods that can provide alarms and/or notifications when certain levels of risks are detected for an individual attempting to enter or exit an environment that needs to be secured, namely a secure environment, a secure area, or a secure location. The risk factors or risks profiles for a facility are suggested by the definitions incorporated herein, but additional criteria or elements that are common to immigration, border patrol, or police security can be inserted or substituted for the items noted below.

A facility within the scope of the embodiments of the methods can be: an airport; a train station; a computer program; a building, such as an office, a warehouse, a business; a parking garage; a country border; an internal country checkpoint; a common carrier, such as an airplane or a train; a car; a truck; a military vehicle; a laboratory; a school; a military base; a private company complex; a monument; a government building; or a similar structure. Other examples of facilities can include: a specified area; the Pentagon; train stations; bus terminals; sports facilities, such as stadiums, parks, and sports centers; casinos; hotels; large venue entertainment areas, such as the MGM Grand convention complex; large venue trade shows, such as the Sands Convention Center in Las Vegas; a specified area of an open space, and a specified area located within the proximity of a secured area, such as a secured parking lot for a secured building.

The environmental risk profiles can be an arbitrary designation associated with a secured environment, secured area, or secured location. The environmental risk profiles can be assigned by the owner of the secured environment based upon the level of access and level of security the owner wishes to maintain in the area. For example, if the secured area is a special laboratory where a company is doing research and development, the owner can assign a high environmental risk profile of "V" in order to limit the access to the secured area only to people with a high clearance code of a "B" for complete access to the facility.

The individual risk profile can be an arbitrary designation associated with a given individual based on answers to a set of questions for registering the person. For example, a low risk profile for an individual can be a "B" having the best clearance possible or a high clearance code, such as a top National Aeronautics and Space Administration (NASA) official. Alternatively, a janitor can have a risk profile of "F" for a high risk and limited access to secured areas of the facility. The individual risk profile can be compared to the environmental risk profile for the facility in order to determine whether the individual can enter a given location by using a set of rules, such as 80% of the questions asked yielding a "yes" answer from the person.

The methods contemplate that the individual risk profiles can be letter designations, number designations, alphanumeric designations, or similar types of assigned values. The individual risk profile need can be of the sort that is comparable so that a determination can be made as to whether an individual is an authorized individual.

For illustrative purposes, the individual risk profiles can include six classes, such as risk profile "A", risk profile "B", risk profile "C", risk profile "D", risk profile "E", or risk profile "F", wherein "A" is allowed no access, and "B" through "F" have access depending on the person's answers to the set of questions.

The embodiments of the method further include entering the individual identification code (IIC) into the point of entry system for the facility for a subsequent first transmission to, and a first communication with, the authentication server. Entering the individual identification code (IIC) into the point of entry system facilitates in subsequent verification of identities as a person approaches an installation for entry and access. Each person can be given an initial individual risk profile, such as a "B" for a low risk or a high clearance and complete access to the facility or an "F" for a high risk factor with very limited access to the facility. The point of entry system can include a database, wherein the personal data can be held for comparison purposes, such as weight, color of eyes, and last country visited. Further, the point of entry system can include a processor and a memory with a graphical user interface with computer instructions to instruct the processor to form: an internet query, an e-mail query, a network query, comparative information transfers, and combinations thereof.

The steps of the method further include obtaining data at a first point in time on the person and linking the data to the individual identification code (IIC). The first point in time can be the same time as the time of issuance of the individual identification code (IIC) to the person, such as Tuesday at 10:00 a.m. at the Shopping Mart, or the data can be obtained at a different time, such as Wednesday at 10:00 p.m. at the Pentagon, which is at a point of entry for a secure installation. Desirably, the data can be obtained at the same point in time as the registration of the person with the authorizing public entity or authorizing private entity and the assessing of the individual risk profile. The individual risk profile can be changeable over time depending on changes in facts or events related to the individual.

The personal data can be placed on a smart card and can be in addition to the individual identification code (IIC). The individual identification code (IIC) can be personal data that can include: biometric data, a personal identification number or code (PIN), an electronic signature, an electro-biometric signature, other personal data, and combinations thereof. The personal data can include a photographic image of the person, which can be linked to the individual identification code (IIC). The personal data can further include: the person's name; the person's address; the person's phone number; a government issued license number, such as a military identity number, a passport number, and a driver's license number; the person's social security number; a government security clearance code; a government issued status; a military status; citizenship information; a racial background; a country of origin; a date of birth; a location of birth; a height; a weight; a hair color; a name of a voluntary emergency contact person(s); voluntary health information, such as a personal health history; and combinations thereof.

The individual risk profile can be a letter. For example, the individual risk profile can be a letter from "A" to "F", which can be determined by a percentage of answers to a defined set or a plurality of questions for which the individual risk profile is assigned. For example, if a person answers "yes" eighty percent (80%) of the time to a defined set of questions, then a first set of rules are applied and an individual risk profile "B" is assigned to the person. Accordingly, an individual risk profile "C" is assigned if the person answers "yes" seventy percent (70%) of the time to the defined set of questions, an individual risk profile "D" is assigned if the person answers "yes" sixty percent (60%) of the time to the set of questions, an individual risk profile "E" is assigned if the person answers "yes" fifty percent (50%) of the time to the set of questions, and an individual risk profile "F" is assigned if the person answers "yes" less than fifty percent (50%) of time to the set of questions. An individual risk profile "A" is assigned to persons having no access to the building.

The plurality of questions can include a set of questions regarding: an individual's immigration; an individual's police records; an individual's arrests; an individual's occupation; an individual's possessions; an individual's parole status; an individual's prior dates of admissions to the facility; an individual's prior dates of denials to the facility; a seizure of items prohibited in the facility from the individual; an individual's name, an individual's address, an individual's nationality, an individual's height, an individual's weight, an individual's social security number, an individual's passport number, an individual's government identification type, an individual's government identification number, an individual's credit card number, an individual's fingerprint, an individual's digital photo, an individual's age, and combinations thereof. A set of rules can be applied to update the individual risk profile by the authentication server using the retrieved personal data for accessing the facility.

An environmental risk profile of "0" for a facility can mean that all individuals can proceed into the facility, regardless of their individual risk profile. An environmental risk profile can include one environmental risk factor for a facility. For example, an environmental risk factor of "I" can be for a low security risk facility, and individuals with risk factors of "F", "E", "D", "C", and "B" can be permitted access to the facility. An environmental risk factor of "II" can be assigned to a slightly higher risk facility, and individuals with a risk factor of "E", "D", "C", and "B" can be permitted access. An environmental risk factor of "III" permits persons with risk factors of "D", "C", and "B", to enter the facility, and an environmental risk factor of "IV" permits persons with risk factors of "C" and "B" to enter the facility. An environmental risk factor of "V" can be the highest security risk level for a facility and only persons who have answered "yes" for eighty percent (80%) or greater of the time to a defined set of questions, thus having an individual risk profile of "B", can be permitted access to the facility.

The embodiments of the method can include assigning at least one environmental risk profile to a facility. However, a facility can include one or more secured areas located within the facility, or a facility can include proximal secured areas to a main or central secured area. Thus, a facility can require one or more environmental risk factors per environmental risk profile for the facility. This is because each secured area of the facility is assigned an environmental risk factor for the area. For example, a facility can be assigned an environmental risk profile with environmental risk factors of "V" and "IV". Accordingly, persons with individual risk profiles of "B" are allowed access throughout the facility, including areas with "IV" and "V" environmental risk factors; and, persons with individual risk profiles of "C" are allowed only in areas having a "IV" environmental risk factor. All other persons with individual risk profiles, including "A", "D", "E", and "F", are not allowed access to the facility.

The following table further provides an example of the correlation of multiple environmental risk factors of an environmental risk profile for a facility to individual risk profiles for persons desiring access to the facility:

| | |
|---|---|
| environmental risk factors: V-IV | individual risk profiles: B, C |
| environmental risk factors: V-IV-III | individual risk profiles: B, C, D |
| environmental risk factors: V-IV-III-II | individual risk profiles: B, C, D, E |
| environmental risk factors: V-IV-III-II-I | individual risk profiles: B, C, D, E, F |

The embodiments of the method further contemplate that an individual can desire to enter the facility at a second point in time, which is later than the first point of time. For example, the second point in time can include a point in time when the person is coming for a meeting at the Pentagon and after the person's smart card has been issued.

The method includes comparing a person's biometric data to a person's smart card personal data at a point of entry of the facility to confirm the person's identity. Next, the method includes making a first transmission, for verifying a person's eligibility, to an authentication server, such as a government authentication server, from the point of entry system. The first transmission requires use of a processor at the point of entry; a smart card reader in communication with the processor of the point of entry system; and a smart card belonging to the person as an individual desiring access to the facility, wherein the smart card is read by the smart card reader of the point of entry system. The first transmission includes the person's individual identification code (IIC) and a first query for personal data on the person desiring access. The first transmission can be directly from a smart card using the point of entry system to a government entity, a government agency, or a private entity in another embodiment.

An authorized entity can be registered with the government, another public entity, or a private entity and can assist in the first transmission from the point of entry system to the authentication server. The authorized entity can include: a police officer; a security guard; a clerk, such as a clerk for a court; an emergency medical technician; a fireman; military personnel, such as an officer; a department of public safety officer; a disaster recovery team member; a hospital worker; an immigration officer; a customs officer; a physician; a federal airport security personnel; an employee; and combinations thereof.

The authentication server can be located at: a United States (U.S.) Passport agency, an Immigration and Naturalization Service, an Internal Revenue Service (IRS), a state driver's licensure agency, a state park, a federal park, a federal monument, a voter registration bureau, a social security agency, a military agency, a professional licensure agency, a police department, a drug enforcement agency, an education institution, a city human service agency, a county human service agency, a state human service agency, a federal human service agency, and combinations thereof.

The authentication server can be linked to a secondary or an additional database, such as an Interpol database, a United States (U.S.) Border Patrol database, a U.S. police database, a U.S. Federal Bureau of Investigation (F.B.I.) database, a U.S. Central Intelligence Agency (C.I.A.) database, a state agency fingerprint database, an immigration database, and combinations thereof, for providing additional information on the person. The embodiments of the methods permit optional, additional transmissions to at least one information server in accordance with a set of transmission rules for retrieving additional information on the person.

The methods include a second set of rules for compiling data from optional, additional transmissions with the individual risk profile and using a ranking of low risk to high risk for assigning letters, numbers, or combinations thereof, to identify the particular individual risk profile. After the information is compiled into an updated individual risk profile, the authentication server transmits a second transmission to the point of entry system to provide this updated individual risk profile. The second transmission can include additional personal data which updates the individual risk profile and verifies eligibility, such as a telephone number change or an employment title change for the person.

Then, the embodiments of the method can include a third set of rules as computer instructions for comparing the individual risk profile with the environmental risk profile for the facility or the secured areas of the facility, and the embodiments include only permitting a person with an equivalent risk profile or a lower risk and higher clearance to enter the facility or the secured areas of the facility. Next, the embodiments of the method include making a third transmission from the point of entry system to the authentication server for the government entity, other public entity, private entity, and combinations thereof, to provide the further updated individual risk profile, such as an updated individual risk profile including a list of previous accesses to a particular facility. For example, the updated risk profile can include a Level V access that was granted to the person on a specific date, such as Oct. 3, 2005, and the updated individual risk profile of "B" for accessing the facility.

The embodiments of the method include a smart card which can facilitate the first, second, and third transmissions from the point of entry system and can be used in conjunction with the risk factors and risk profiles to identify the smart card holder, to assist in verification of the eligibility of the smart card holder, and to provide updated information for verifying completion of the identity authentication and eligibility process for the smart card holder desiring access to the facility.

The smart card can be used for registering a person using an authentication server to control access to a public or private facility. The smart card can include: at least one processor with at least one memory chip for storing data, such as biometric data for identifying the smart card holder. The smart card can be activated when the biometric reader reads the biometric data of the smart card. The smart card can operate to: transmit a first transmission via a point of entry system to an authentication server comprising data on the smart card holder, receive a second transmission via a point of entry system from the authentication server which includes an indication that the smart card holder has an individual risk factor, and transmit a third transmission to the authentication server via a point of entry system to update the records of the smart card holder. The smart card transmissions can update the individual risk profile by providing such information as: the smart card holder's individual risk profile has changed or has not changed, a number of attempts at entry to the controlled access facility, and combinations thereof.

The embodiments permit the authentication server and the point of entry system to include databases with computer instructions to provide a notification and/or an alarm when the smart card holder does not meet the individual risk profile needed for access to the facility.

The smart card can receive information, that can be downloaded from the computers of a government entity, other public entity, or a private entity, for storage on the smart card. For example, the smart card can contain personal information on at least one or more of the following:

a. personal name (example—Richard Wood);
b. personal address (example—2396 Wood Street, Houston, Tex. 77019);
c. personal phone number (example—713-333-5555);
d. personal fax number (example—713-333-5554);
e. personal email address (example—Wood@aol.com);
f. government agency name and/or government administrator name (example—Thomas Jefferson, United States Patent and Trademark Office);
g. government agency address;
h. government phone number (example—281-888-1234);
i. government agency fax number;
j. government agency e-mail;
k. government's website;
l. instructions (example—handicapped employee);
m. other phone numbers;
n. issue date or "validity" date;
o. an expiration date or "expiry date";
p. statements as to ownership of the card;
q. statements as to eligibility of the holder and the existence of written agreements related to the card; and
r. disclaimers concerning use, misuse, and revocation of the card.

In an embodiment, the smart card can be used for identity authentication by a person desiring access to a secured facility. Alternatively, the smart card can be used for access to a level of funds from an authorizing provider, for registrations and accesses to public and/or private programs, and combinations thereof.

The embodiments of the methods contemplate that the point of entry system can obtain information pertaining to: a former prison inmate and parole status; times and dates of prior admissions and prior denials to this secure environment or similarly rated secure environments; prior seizures of items prohibited in the secure environment, such as knives, guns, weapons, and chemical explosives; "wanted" list information; and pending court judgments using this method.

Further, the embodiments described herein facilitate the tracing and tracking of activities and movements of persons, insure identity theft reduction, provide positive identity for many situations including emergency situations for determining identity quickly, provide aid for enforcement, provide fraud reduction, and facilitate tracing and tracking of persons in any place or situation where a positive identity can be helpful. Additionally, the method can save money and time with regard to providing security measures and programs, for example. The embodiments of the method can further reduce administrative costs and provide a probable reduction of labor costs.

The embodiments include method steps for controlling access to funds for an authorizing provider having a point of entry system, in which the authorizing provider can be: a bank, a banking machine, a computer program, a computer, a state agency member, a federal agency member, a credit card service, a banking service, and combinations thereof.

The methods include assigning a risk factor to an authorizing provider, or an authorizing service provider, which includes a point of entry system. Then, a person desiring access to a level of funds from the authorizing provider can be registered by using an authentication server for providing information to the authorizing provider and by issuing an individual identification code (IIC) to the person on a smart card. The individual identification code (IIC) can include: a first biometric data, a first personal identification number code (PIN), a first electronic signature, personal data, and combinations thereof, with regard to the person. In an embodiment, personal data, which can include personal information, biometric data, and combinations thereof, can be placed on a memory chip embedded within the smart card. Alternatively, personal data can be located within the smart card using a magnetic stripe and barcodes for identity authentication and confirmation purposes of the person as the smart card holder.

The methods continue with obtaining data at a first point in time on the person and comparing the obtained data to a first set of rules to create an access level to funds for the person. The first set of rules can include the steps of asking an individual a plurality of questions, such as a defined set of questions to create personal data pertaining to: an individual's name, an individual's address, an individual's phone number, an individual's occupation; an individual's account information; an individual's date of birth; an individual's possessions; an individual's nationality, an individual's social security number; an individual's credit card number; an individual's fingerprint; an individual's digital photo; an individual's electro-biometric signature; and combination thereof. Identification of the person requesting an access level to funds from the authorizing provider via the point of entry system can be performed by using: a biometric reader, a numerical code reader or detector, a voice pattern recognition reader, a retinal scanner, a fingerprint reader, a telemetry card reader, a barcode reader, a Deoxyribonucleic Acid (DNA) reader, a palm reader, a facial recognition reader, a vein reader, biometric scanners, other biometric readers, and combinations thereof.

The embodiments of the methods include activating the smart card by using the point of entry system to read the personal data, which can be biometric data of the person, that is stored on the smart card. Then, biometric data of the person, such as the person's fingerprint, can be obtained at the point of entry for comparison to the personal and/or biometric data that is stored on the smart card for the smart card holder. If the smart card personal data and the biometric data of the person at the point of entry are the same data, or represent the same person, then the person's identity is confirmed and the steps of the method continue. If the smart card personal data and the biometric data of the person at the point of entry are not the same, or do not represent the same person, then the person's identity is not confirmed and the person at the point of entry is denied access to the funds. Alternatively, the person at the point of entry can be detained to allow for additional information data transmissions, which can be used in further data comparisons to verify the identity of the person at the point of entry as the smart card holder.

The embodiments of the methods continue by using the point of entry system to read the biometric data of the smart card and transmit a first transmission to the authentication server of the authorizing provider. The first transmission to the authentication server is made for obtaining the access level of funds for the person, which includes verification of the person's eligibility to the funds. The first transmission can be facilitated by a registered entity with the authorizing provider, such as a banking officer, a banking employee, a banking machine, a banking computer, a state agency officer, a federal agency officer, a credit reporting officer, a credit reporting employee, other employees, and combinations thereof. The point of entry system can include a processor with a memory and a graphical user interface (GUI) with computer instructions to instruct the processor to form: an internet query, an e-mail query, a network query, comparative information transfers, an accounting system query, and combinations thereof, for acquiring the needed information.

Optional, additional transmissions to at least one information server or secondary server can be performed according to a set of transmission rules to retrieve additional information on the person.

Next, the authentication server and a second set of rules can be used to update the access level to funds for the person using the retrieved data. Then, the updated access level to funds can be transmitted to the point of entry system for comparisons using a third set of rules to correlate the individual's access level to funds with the risk factors for the authorizing provider to further determine an updated access level to funds for the person. For example, if a person's eligibility is denied, then the person has no access to funds and the corresponding risk factor for the authorizing provider is "0". If the person's eligibility is granted, then sets of rules are applied, such as a person's answers to a plurality of questions and the corresponding risk factor for the authorizing provider, to permit access to a level of funds at, for example, "up to $5,000".

The following table further provides examples of the correlations between the authorizing provider's risk factors and the person's access levels to funds:

| Risk Factor: 0 | Access Level to Funds: No Access |
| Risk Factor: 1 | Access Level to Funds: Complete |
| Risk Factor: 2 | Access Level to Funds: up to $1,000 |
| Risk Factor: 3 | Access Level to Funds: up to $2,500 |
| Risk Factor: 4 | Access Level to Funds: up to $5,000 |
| Risk Factor: 5 | Access Level to Funds: up to $10,000 |

The authentication server sends a second transmission to the point of entry system of the authorizing provider to provide the updated access level to funds for the person using personal data and retrieved additional information. The second set of rules can be used in compiling the additional information data from the optional, additional transmissions with the access level to funds using a ranking of low access level to high access level. The updated access level to funds for the person is received by the point of entry system, which verifies the person's eligibility for access.

Next, a third set of rules can be used, which are computer instructions that can instruct the processor of the point of entry system to compare the updated access level to funds for the person with risk factors for the authorizing provider. This serves to update the access level to funds and only permit persons with equivalent or greater access levels to have access to the funds. Then, the point of entry system for the authorizing provider sends a third transmission to the authentication server to further update the access level to funds for the person and completes the process for identification, eligibility, and updating of records for access level to funds.

The methods include an authentication server for an authorizing provider, such as a banking system, a state driver's licensure agency, a social securities agency, an Internal Revenue Service, an Immigration and Naturalization Service, a U.S. Passport agency, a voter registration bureau, a credit reporting agency, a credit card service, and combinations thereof. The authentication server of the authorizing provider can be linked to a secondary server with a database, such as a banking database, a banking machine database, a credit reporting database, an accounting database, a state agency database, a federal agency database, and combinations thereof, for providing additional information.

With reference to the figures, FIG. 1 depicts an embodiment of a method for controlling access to a facility by an individual using a smart card (5). The method includes assigning an environmental risk profile to the facility. Next, a person can be registered for access to a facility by using an authentication server (10), such as a government authentication server, and issuing an individual identification code (IIC) to the person on a smart card (95). The authentication server (10) can include a processor (15), with a memory (20) and computer instructions (25). The processor communicates with a data storage (30), which includes a database (35) for storing personal data information and individual risk profiles. The authentication server (10) can interface with a network (50), such as the Internet, to communicate with a point of entry system (65) through I/O ports (40 and 70) to ultimately communicate with the person's smart card (95).

The method includes obtaining data on the person at a first point in time and comparing the data to a first set of rules to form an individual risk profile for the person. Then, the profile and other biometric or personal data can be stored on the smart card. Next, the personal data of the person, including biometric data, that is stored on the smart card can be read by a biometric reader in order to activate the smart card (95) for the smart card holder. The smart card is an electronically readable card that includes a memory chip (105), which is located within a processor (100) of the smart card. Accordingly, the smart card can maintain such information as: a person's name, a person's address, a person's phone numbers, a person's account numbers, a person's social security number, as well as individual risk profile data, biometric data, and other computer instructions. The personal data on the smart card can be encrypted.

The smart card can be read by a smart card reader (90) on a point of entry system (65) that can contact the authentication server (10) via the network (50) to verify the person's eligibility and obtain the person's individual risk profile. The point of entry system (65) includes a processor (75) that can communicate with the network (50) for interactions with the authentication server (10) and other, optional, content servers. The point of entry system processor (75) can communicate with a graphical user interface (72) and a data storage (80) with computer instructions (85).

The next step in the method can include optional, additional transmissions to additional information servers (55 and 60) with databases, wherein the transmissions can be in accordance to preferences at the point of entry system. The processor and a set of procedures in the memory of the processor of the authentication server can be used to formulate an updated individual risk profile using the retrieved data, such as data from the additional information servers (55 and 60). Then, the updated individual risk profile for the person can be formed by compilations and comparisons using a second set of rules and transmitted back to the point of entry system (65).

Next, the updated individual risk profile for the person can be compared or correlated to the environmental risk profile for the facility and a third set of rules can be applied for determining if the person can enter the facility with the assessed environmental risk profile. Then, the point of entry system (65) can transmit a third transmission to the authentication server (10) to further update the individual risk profile for the person and complete the process regarding the person's access to the facility.

Figure 2:
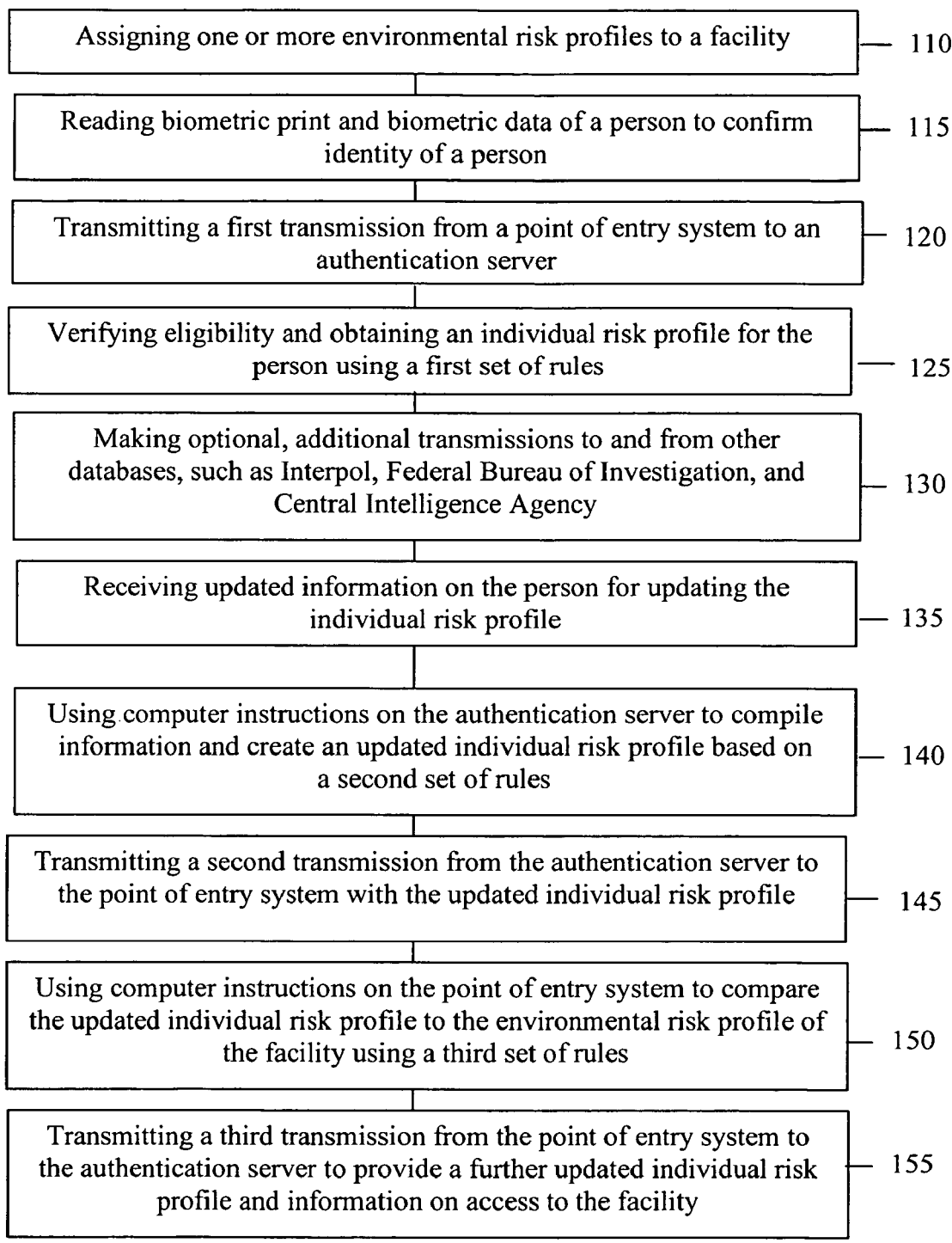
FIG. 2 depicts a flowchart of an embodiment of a method for controlling access to a facility by an individual using a smart card.

FIG. 2 depicts a flowchart of an embodiment of the method for controlling access to a facility by an individual using a smart card. The steps of the method include assigning one or more environmental risks profiles to a facility (110), in which the environmental risk profiles depend on the level of security at the facility and the number of secured areas at risk. The next step of the method can involve reading a person's biometric print or biometric data by reading the person's smart card for the purpose of identifying the person (115).

To confirm or verify the identity of the person desiring access at the point of entry, the person's biometric data, such as a fingerprint, can be obtained from the person at a point of entry and, then, compared to the smart card biometric data or smart card personal data, such as a fingerprint stored on the memory chip of the smart card or other biometric or personal data stored on the person's smart card. The comparison is performed to determine if the biometric data obtained from the person at the point of entry and the smart card data are the same or represent the same person. If the data is the same or represents the same person, then the identity of the person desiring access is confirmed and verified as the smart card holder.

Then, the smart card can be read at the point of entry system for the facility, and the method can include the point of entry system sending a first transmission from the point of entry system to the authentication server (120) for verifying the person's eligibility for accessing the facility. The point of entry system can communicate with the authentication server via a network for verification of eligibility of the person holding the smart card and for obtaining a current individual risk profile on the person (125) by using a first set of rules.

Next, optional, additional transmissions from the processor of the authentication server to databases of information servers, such as an Interpol server system, a Federal Bureau of Investigation (FBI) server system, and a Central Intelligence Agency (CIA) server system, can be made (130), and the requested information can be received back by the authentication server (135) and to the point of entry system.

The authentication server uses computer instructions to initially assign an individual risk profile based on a first set of rules for assigning individual risk factors, such as letters "A" through "F". Then, the authentication server uses computer instructions and a second set of rules for compiling and comparing the retrieved additional information data to create an updated individual risk profile (140) which is transmitted, then, from the authentication server to the point of entry system in a second transmission (145).

Next, the point of entry system uses computer instructions and a third set of rules for comparing the updated individual risk profile to the environmental risk profile, such as environmental risk profiles of "I" through "V", which are assigned to a facility, or each secured area of the facility, to determine if the person with the updated individual risk profile can enter and access the facility with the assessed environmental risk profile (150). Then, the point of entry system transmits a third transmission to the authentication server with the further updated individual risk profile information to further update the individual risk profile for the person, which is stored on the authentication server (155).

Figure 3:
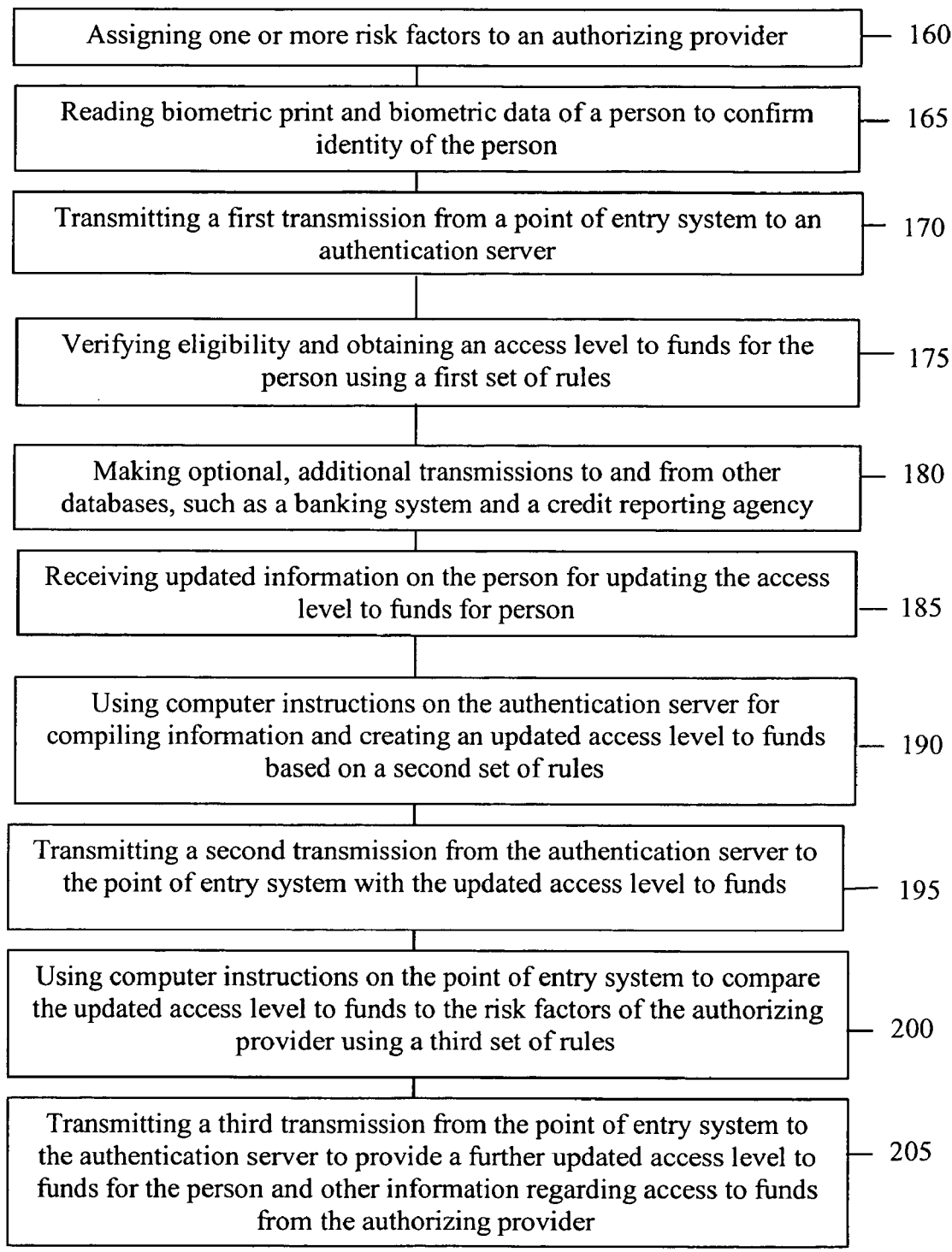
FIG. 3 depicts a flowchart of an embodiment of a method for controlling access to a level of funds from an authorizing provider to an individual using a smart card.

FIG. 3 depicts a flowchart of an embodiment of the method for controlling access to funds from an authorizing provider, or authorizing service provider, to an individual using a smart card. The method includes assigning one or more risks factors to the authorizing provider (160), in which the risk factors correlate to access levels of funding by the authorizing provider. Then, a person desiring access to a level of funds from the authorizing provider can be registered by using an authentication server for providing information to the authorizing provider and by issuing an individual identification code (IIC) to the person on a smart card. Alternatively, the person can be pre-registered with an individual identification code stored on a smart card.

The next step of the method involves reading a person's biometric print or biometric data by reading the person's smart card for the purpose of identifying the person (165). To confirm or verify the identity of the person at the point of entry, the person's biometric data, such as a fingerprint, can be obtained from the person at a point of entry and, then, compared to the smart card biometric data or smart card personal data. The comparison is performed to determine if the biometric data obtained from the person at the point of entry and the smart card data are the same or represent the same person. If the data do not represent the same person, then the identity of the person at the point of entry is not confirmed and the person is denied access to funds. If the data are the same or represent the same person, then the identity of the person at the point of entry is confirmed and verified as the smart card holder and the method continues.

The next steps of the method include reading the smart card data at the point of entry and transmitting a first transmission from the point of entry system to an authorizing provider's authentication server (170) for verifying eligibility of the person for accessing funds at the point of entry. The point of entry system communicates via a network with the authentication server for the authorizing provider to confirm the eligibility of the person and obtaining current, or existing, access level to funds information on the person (175) by using a first set of rules.

Then, optional, additional transmissions are made to and from databases of additional information servers, such as banking systems and credit reporting agencies (180), for obtaining additional information, and the requested information is received by the authentication server to be used in updating the access level to funds for the person (185).

The authentication server uses computer instructions and a second set of rules for compiling the retrieved additional information and for creating an updated access level to funds for the person (190), such as assigning a numbered dollar amount of "up to $1,000" through "up to $10,000" as a level of funds. Then, the authentication server transmits a second transmission to the point of entry system with the updated access level to funds information to update the access level to funds for the person (195).

The point of entry system processor then uses the updated access level to funds with computer instructions and a third set of rules to compare the updated access level to funds with the risk factors of the authorizing provider, such as "0" through "5" (200) to determine an access level to funds. Then, the point of entry system sends a third transmission to the authentication server for providing a further updated access level to funds for the person and other information regarding the person's access to funds from the authorizing provider (205).

While these embodiments have been described with emphasis on the embodiments, it can be understood that within the scope of the appended claims, the embodiments might be practiced other than as specifically described herein.

What is claimed is:

1. A method for controlling access for a facility comprising:
   a. assigning an environmental risk profile to the facility comprising a point of entry system;
   b. registering a person by using an authentication server of an authorized entity, wherein The registering of the person comprises issuing an individual identification code to the person on a smart card comprising a personal data recorded on a chip of the smart card, wherein the individual identification code comprises a member selected from die group consisting of: a first biometric data, a first personal identification number code, a first electronic signature, a personal data, and combinations thereof;
   c. obtaining data on the person at a first point in time;
   d. comparing the data on the person to a first set of rules to form an individual risk profile for The person;
   e. comparing the data obtained on the person at the point of entry to data of the person stored on the smart card to verify an identity of the person at the point of entry system;
   f. reading the data of the person stored on the smart card by using the point of entry system to send a first transmission to the authentication server to obtain the individual risk profile for the person to verify an eligibility for the person to access the facility;
   g. updating the individual risk profile of the person by using the authentication server for compiling retrieved additional information on the person and applying a second set of rules;
   h. transmitting a second, transmission to the point of entry system from the authentication server for providing an updated individual risk profile;
   i. comparing the updated individual risk profile to the environmental risk profile of the facility using the point of entry system and applying a third set of rules to determine if the person with the updated individual risk profile can enter the facility with an assessed environmental risk profile; and
   j. transmitting a third transmission from the point of entry system to the authentication server to provide a further updated individual risk profile to the authentication server.

2. The method of claim 1, wherein the authentication server comprises a member selected from the group consisting of: a U.S. Passport agency, an Immigration and Naturalization Service, an Internal Revenue Service, a stale driver's licensure agency, a state park, a federal park, a federal monument, a voter registration bureau, a social security agency, a military agency, a professional licensure agency, a police department, a drug enforcement agency, an education institution, a city human service agency, a county human service agency, a state human service agency, a federal human service agency, and combinations thereof.

3. The method of claim 1, wherein the personal data comprises a member selected from the group consisting of:
   i. a personal name;
   ii. a personal address;
   iii. a personal phone number;
   iv, a government issued number:
   v. a personal social security number;
   vi. a government security clearance code;
   vii. a government issued status;
   viii. a military status;
   ix. a citizenship information;
   x. a passport number;
   xi. a racial background;
   xii. a country of origin;
   Xiii. a voluntary emergency contact person name;
   xiv. voluntary health information;
   xv. a personal date of birth;
   xvi. a personal place of birth;
   xvii. a personal height;
   xviii. a personal weight;
   xix. a hair color; and
   xx. combinations thereof.

4. The method of claim 1, wherein the first transmission is facilitated by an authorized entity registered with a member selected from the group consisting of: a government entity, a private entity, other public entity, and combinations thereof.

5. The method of claim 4, wherein the authorized entity comprises a member selected from the group consisting of: a police officer, a security guard, a clerk, an emergency medical technician, a fireman, a military personnel, a department of public safety officer, a physician, a disaster recovery team member, a hospital worker, an immigration officer, a customs officer, a federal airport security person, a border patrol officer, an employee, and combinations thereof.

6. The method of claim 1, wherein the personal data on the smart card is encrypted.

7. The method of claim 1, wherein the point of entry system comprises: a processor with a memory and a graphical user interface (GUI), wherein the memory comprises computer instructions to instruct the processor to form a member selected from the group consisting of an internet query, an e-mail query, a network query, comparative information transfers, and combinations thereof.

8. The method of claim 1, wherein the facility comprises a member selected from the group consisting of: a bank, a computer program, an airport, a train, an airplane, a truck, a military vehicle, a car, a building, a stadium, an office, an open secured space, a specified area, a computer, a border of a country, an internal country checkpoint, a specified area proximal to a secured building, and combinations thereof.

9. The method of claim 1, wherein the step of requesting access to the facility at the point of entry is performed using a member selected from the group consisting of: a fingerprint reader, a numerical code reader, a voice pattern recognition reader, a retinal scanner, a telemetry card reader, a barcode reader, a Deoxyribonucleic Acid (DNA) reader, a palm reader, a facial recognition reader, a vein reader, an electro-biometric signature reader, other biometric readers, and combinations thereof.

10. The method of claim 1, further comprising the step of sending additional transmissions to and from at least one secondary server according to a set of transmission rules to retrieve additional information on the person.

11. The method of claim 10, wherein the authentication server is linked to at least one secondary server with a database, wherein the database is a member selected from the group consisting of: an Interpol database, a United States (U.S.) Border Patrol database, a U.S. police database, a U.S. Federal Bureau of Investigation (FBI) database, a U.S. Central Intelligence Agency (CIA) database, a state agency fingerprint database, an immigration database, and combinations thereof.

12. The method of claim 1, wherein the first set of rules includes the step of asking an individual a plurality of questions regarding a member selected from the group consisting of: an individual's immigration, an individual's police records, an individual's arrests, an individual's occupation, an individual's possessions, an individual's parole stats, an individual's prior dates of access to the facility, an individual's prior dates of denials for access to the facility, a seizure of items prohibited in the facility from die individual, an individual's name, an individual's address, an individual's nationality, an individual's height an individual's weight, an individual's social security number, an individual's passport number, an individual's government identification type, an individual's government identification number, an individual's credit card number, an individual's fingerprint, an individual's digital photo, an individual's age, and combinations thereof.

13. The method of claim 1, wherein the second set of rules compiles data from additional transmissions with the individual risk profile using a ranking of low risk to high risk.

14. The method of claim 1, wherein the third set of rules is computer instructions instructing a processor of the point of entry system to compare individual risk profiles with environmental risk profiles for the facility and only permit individuals with equivalent or lesser risk and higher clearance to enter the facility.

15. The method of claim 1, wherein the facility comprises at least one secured area, wherein the facility is assigned an environmental risk profile comprising at least one environmental risk factor assigned to each secured area of the facility.

16. The method of claim 1, wherein the step of confirming the identity of the person farther comprises a member selected from the group consisting of: scanning a smart card wit biometric data, scanning a cardless biometric data, transmitting a contactless personal data, scanning and transmitting a contactless biometric data, and combinations thereof.

17. A method of controlling an access to a level of funds for an authorizing provider, wherein the method comprises:
  a. assigning a risk factor to the authorizing provider comprising a point of entry system;
  b. registering a person by using an authentication server of the authorizing provider, wherein the registering of the person comprises issuing an individual identification code to the person on a smart card, wherein the smart card comprises personal data recorded on a chip of the smart card, wherein the individual identification code comprises at least one of a member selected from the group consisting of: a first biometric data, a first personal identification number code, a first electronic signature, a biometric signature, a personal data, and combinations thereof;
  c. obtaining data on the person at a first point in time;
  d. comparing the data on the person to a first set of rules to form an access level to funds for the person;
  e. comparing the data obtained on the person at the point of entry to data stored on the smart card to confirm an identity of the person at the point of entry system;
  f. reading the data stored on the smart card using the point of entry system to send a first transmission to the authentication server for the authorizing provider to verify an eligibility for the person for the access level to funds;
  g. updating the access level to funds for the person by using the authentication server for compiling retrieved additional information and applying a second set of rules;
  h. transmitting a second transmission to the point of entry system for the authorizing provider from the authentication server to provide the updated access level to funds for the person;
  i. comparing an updated access level to funds to the risk factor for the authorizing provider and applying a third set of rules to determine a further updated access level to funds for the person;
  j. transmitting a third transmission from the point of entry system for the authorizing provider to the authentication server to provide the further updated access level to funds for the person.

18. The method of claim 17, wherein the authentication server comprises a member selected from the group consisting of: a banking system, a state driver's licensure agency, a social security agency, an Internal Revenue Service, an Immigration and Naturalization Service, a United States (U.S.) Passport agency, a voter registration bureau, a credit reporting agency, a credit card service, and combinations thereof.

19. The method of claim 17, wherein the authorizing provider comprises a member selected from the group consisting of: a bank, a banking machine, a computer program, a computer, a state agency member, a federal agency member, a credit card service, a banking service, and combinations thereof.

20. The method of claim 17, wherein the first transmission is facilitated by a registered entity with the authorizing provider, wherein the registered entity comprises a member selected from the group consisting of: a banking officer, a banking employee, a banking machine, a banking computer, a state agency officer, a federal agency officer, a credit reporting officer, a credit reporting employee, an employee, and combinations thereof.

21. The method of claim 17, wherein the point of entry system for the authorizing provider comprises: a processor with a memory and a graphical user interface, wherein the memory comprises computer instructions to instruct the processor to form a member selected from the group consisting of: an internet query, an e-mail query, a network query, a comparative information transfer, an accounting system query, and combinations thereof.

22. The method of claim 17, wherein the step of requesting the access level to funds is performed using a member selected from the group consisting of: a fingerprint reader, a numerical code reader, a voice pattern recognition reader, a retinal scanner, a telemetry card reader, a bar code reader, a Deoxyribonucleic Add (DNA) reader, a palm reader, a facial recognition reader, a vein reader, other biometric readers, and combinations thereof.

23. The method of claim 17, further comprising the step of sending additional transmissions to and from at least one secondary server according to a set of transmission rules to retrieve additional information on the person.

24. The method of claim 23, wherein the authentication server for the authorizing provider is linked to the at least one secondary server with a database, wherein the database is a member selected from the group consisting of: a banking database, a banking machine database, a credit reporting database, an accounting database, a state agency database, a federal agency database, and combinations thereof.

25. The method of claim 17, wherein the first set of rules includes the step of asking an individual a plurality of questions to create the personal data comprising a member selected from the group consisting of: an individual's name, an individual's address, an individual's phone number, an individual's occupation; an individual's account information; an individual's date of birth; an individual's possessions; an individual's nationality, an individual's social security number; an individual's credit card number; an individual's fingerprint, an individual's digital photo, and combinations thereof.

26. The method of claim 17, wherein the second set of rules compiles data from optional, additional transmissions with the access level to funds using a ranking of low access level to funds to high access level to funds.

27. The method of claim 17, wherein the third set of rules is computer instructions instructing the processor of the point of entry system to compare the access level to funds for the person with the risk factor for the authorizing provider to update the access level to funds for the person and only permit persons with equivalent or higher access levels to have access to the funds.

28. The method of claim 17, wherein the step of confirming the identity of the person further comprises a member selected from the group consisting of: scanning a smart card with biometric data, scanning a cardless biometric data, transmitting a contactless personal data, scanning and transmitting a contactless biometric data, and combinations thereof.

* * * * *